United States Patent
Nummila-Pakarinen et al.

(10) Patent No.: US 9,593,177 B2
(45) Date of Patent: *Mar. 14, 2017

(54) POLYETHYLENE

(71) Applicant: BOREALIS AG, Vienna (AT)

(72) Inventors: Auli Nummila-Pakarinen, Porvoo (FI);
Bernt-Ake Sultan, Stenungsund (SE);
Bjorn Voigt, Hisings Backa (SE);
Martin Anker, Hisings Karra (SE);
Mattias Bergqvist, Gothenberg (SE);
Thomas Gkourmpis, Gothenburg (SE);
Thomas Hjertberg, Kungshamn (SE)

(73) Assignee: Borealis AG, Vienna (AT)

( * ) Notice: Subject to any disclaimer, the term of this patent is extended or adjusted under 35 U.S.C. 154(b) by 229 days.

This patent is subject to a terminal disclaimer.

(21) Appl. No.: 14/353,952

(22) PCT Filed: Dec. 7, 2012

(86) PCT No.: PCT/EP2012/005073
§ 371 (c)(1),
(2) Date: Apr. 24, 2014

(87) PCT Pub. No.: WO2013/083285
PCT Pub. Date: Jun. 13, 2013

(65) Prior Publication Data
US 2014/0275427 A1   Sep. 18, 2014

(30) Foreign Application Priority Data
Dec. 9, 2011 (EP) ..................... 11192715

(51) Int. Cl.
*C08F 10/02* (2006.01)
*C08L 23/20* (2006.01)
*C08L 23/12* (2006.01)
*C08L 23/14* (2006.01)
*C08L 23/06* (2006.01)
*C08L 23/08* (2006.01)
*C08F 110/02* (2006.01)

(52) U.S. Cl.
CPC ............ *C08F 10/02* (2013.01); *C08F 110/02* (2013.01); *C08L 23/06* (2013.01); *C08L 23/08* (2013.01); *C08L 23/12* (2013.01); *C08L 23/14* (2013.01); *C08L 23/20* (2013.01)

(58) Field of Classification Search
None
See application file for complete search history.

(56) References Cited

U.S. PATENT DOCUMENTS

2004/0214971 A1    10/2004   Gonioukh et al.
2009/0156749 A1*    6/2009   Nummila-Pakarinen    C08F 10/02
                                                    525/240

FOREIGN PATENT DOCUMENTS

| | | |
|---|---|---|
| EP | 2 130 865 | 12/2009 |
| EP | 2 239 283 | 10/2010 |
| JP | 2004-018812 | 1/2004 |
| JP | 2007-504329 | 3/2007 |
| WO | WO 93/08222 | 4/1993 |
| WO | WO 03/066698 | 8/2003 |
| WO | WO 2005/002744 | 1/2005 |
| WO | WO 2005/023912 A2 | 3/2005 |
| WO | WO 2009/103516 | 8/2009 |

OTHER PUBLICATIONS

International Search Report mailed Feb. 15, 2013 for International Application No. PCT/EP2012/005073.
Written Opinion mailed Feb. 15, 2013 for International Application No. PCT/EP2012/005073.
International Preliminary Report on Patentability issued Jun. 10, 2014 for International Application No. PCT/EP2012/005073.

* cited by examiner

*Primary Examiner* — Catherine S Branch
(74) *Attorney, Agent, or Firm* — Richard M. Klein; Fay Sharpe LLP

(57) ABSTRACT

The present invention relates to a low density polyethylene having a molecular weight distribution Mw/Mn which is greater than 15, a storage modulus G' (5 kPa) which is above 3000 and a vinylidene content which is at least 15/100 k C, compositions, a process for production of the low density polyethylene, a continuous ethylene polymerization method for introducing vinylidene in a low density polyethylene, a method for an extrusion coating process, an article, e.g. an extrusion article, and use in extrusion coating.

20 Claims, No Drawings

POLYETHYLENE

FIELD OF THE INVENTION

The present invention relates to a new low density polyethylene, compositions, a process for production of the low density polyethylene, a continuous ethylene polymerization method for introducing vinylidene in a low density polyethylene, a method for an extrusion coating process, an article, e.g. an extrusion article, and use in extrusion coating.

BACKGROUND OF THE INVENTION

Low density polyethylene (LDPE), i.e. a polyethylene with a density range of 910-940 kg/m$^3$, is an important thermoplastic polymer and is of practical use in many industrial applications. Conventional low density polyethylene is produced by a high pressure process at a high temperature via free radical polymerization. Autoclave and tubular reactors are the two types of high pressure reactors which are used for producing low density polyethylene.

Further, in extrusion coating a thin film of polymer melt is extruded through a flat die and pressed onto a moving substrate. Extrusion coating is discussed, among others, in Vieweg, Schley and Schwarz: Kunststoff Handbuch, Band IV, Polyolefine, Carl Hanser Verlag (1969), pages 412 to 420. The substrate may be, among others, paper, paperboard, a plastic film or a metal film. The line speed in modern equipment can often be above 300 m/min or above 350 m/min.

Higher line speed sets heavy requirements for the material. Especially draw resonance is a problem often encountered with linear polymers, such as linear low density polyethylene (LLDPE), high density polyethylene (HDPE) or polypropylene (PP). At the onset of draw resonance large oscillations occur in the flow of the polymer melt through the die. Consequently, the coating becomes uneven and large holes may be observed in the coating. The draw resonance is due to the "tension thinning" behaviour of the linear polymers, where the elongational viscosity decreases with increasing tensile strain rate. On the other hand, highly branched polymers like low density polyethylene exhibit strain hardening, where the elongational viscosity increases with increasing tensile strain rate.

The two most important variables defining the processability of a polymer used for extrusion coating is its draw-down (DD) and neck-in (NI). The value of draw-down should be as high as possible in order to obtain as thin as possible coating layer and to allow a high production speed. At the same time it is desirable to have polymers with a low neck-in value. This first of all leads to a broader covering of the substrate, but also to less needs to trim away the outer part of the coated substrate. The latter is related to a phenomenon giving thicker edges of the melt film, "edge-bead". With increasing neck-in this thickening will increase and a larger part of the polymer and substrate must be trimmed away. Further web stability at high line speeds is critical for obtaining extrusion coated surfaces with even coating weight.

Traditionally, the autoclave low density polyethylene has superior processability for extrusion coating together with satisfactory end product properties. Since autoclave plants are getting older and older need for alternative technology giving same processability is needed Traditional tubular LDPE polymers are not fulfilling the requirements set for processability. New polymer structures from tubular reactor are thus needed to meet the requirements of draw-down and neck-in and web stability.

DESCRIPTION OF THE INVENTION

The present invention relates to a low density polyethylene having
a molecular weight distribution Mw/Mn which is greater than 15,
G' (5 kPa) which is above 3000, and
a vinylidene content which is at least 15/100 k C.

The low density polyethylene of the present invention have been produced in a tubular reactor by radical initiated polymerization where the polymerization is performed by reacting the ethylene monomer under the action of one or more radical initiators, such as peroxides, oxygen or combinations thereof, wherein the amount of used radical initiators, i.e. the amount of used active oxygen, is at least 3 times the conventionally used amount. By selecting the amount of used radical initiators in the polymerization we have surprisingly been able to produce a low density polyethylene showing advantageous properties. Thus, for example, the storage modulus G' at loss modulus G"=5 kPa has shown to be generally higher for the low density polyethylene of the present invention than standard tubular materials (low density polyethylenes) produced with conventional techniques.

The new low density polyethylene of the present invention exhibits advantageous processability properties, e.g. improved extrusion coating properties compared to a regular tubular material. Further, the low density polyethylene of the present invention may be comprised in materials useful as melt strength modifier. Linear polyethylenes without long chain branches have for some applications insufficient melt strength, highly branched LDPE are then usually added to increase the melt strength. Traditionally autoclave materials are used but the new low density polyethylene of the present invention, from a tubular reactor origin, can surprisingly also be used as melt strength modifier.

The low density polyethylene of the present invention is a polyethylene having a density in the interval of 910-940 kg/m$^3$, e.g. in the interval of 910-935 kg/m$^3$.

Further, the low density polyethylene of the present invention is also a polyethylene having a density in the interval of 900-935 kg/m$^3$, e.g. in the interval of 910-935 kg/m$^3$.

Further, the low density polyethylene of the present invention has a molecular weight distribution Mw/Mn which is greater than 15.

Mn is the number average molecular weight and Mw is the weight average molecular weight. Mw and Mn are determined according to methods known in the art of Gel Permeation Chromatography (GPC). For branched materials the average molecular weight is determined by the aid of light scattering since the branched structure do not elute according to molecular weight as for linear materials.

The molecular weight distribution Mw/Mn, which is also called MWD or PDI (polydispersity index), is a key parameter for extrusion coating properties. For the neck-in it is required a high molecular weight material with a slow relaxation in the gap of the extrusion coating equipment but for processing reasons a low molecular weight part must be present to get an even processing.

According to the invention, by adding radical initiators, in an amount of at least 3 times the conventionally used amount of radical initiators, during the polymerization step in the tubular reactor, a large amount of chains are initiated via propagation reactions. Consequently, an increase of the weight average molecular weight of the low density polyethylene of the present invention is seen, something seen from the increased Mw/Mn (polydispersity index). The high molecular weight part of the matrix of the low density polyethylene has a significant amount of branches of significant length, thus allowing the entire system to sustain superior mechanical deformation. The level of branching can be directly correlated with the density of the low density polyethylene, thus for systems of decreasing overall density the level of branching is increasing. The reasoning behind the mechanical deformation capabilities of such system is due to extensive level of entanglements present. Since the polymer chains of high molecular weight are expected to be relatively long and since the level of branching is expected to be significant, we can assume that the high molecular weight chains will host the larger branches. Since these branches are also quite long a significant level of entanglement between fragments (segments) of the same or different chains will be present. These entanglements are known to induce increased mechanical deformation resistance in a polymer, and the longer and denser they are the more they increase the overall effect. The reasoning for such resistance has to do with the mobility of the polymer fragments located on either side of the entanglement point. As the deformation force is increased the system will undergo chain slippage across the entanglement point, chain disentanglement, chain re-entanglement and finally chain rupture. Obviously since the entanglement points are increased and the polymer fragment between two consecutive entanglement points is expected to be substantial (after all the branches are long and the molecular weight large) the eventual chain rupture will be delayed due to constant slippages, disentanglements and re-entanglements thus leading to an increase resistance to mechanical deformation.

Autoclave materials, here low density polyethylenes produced in an stirred autoclave reactor, giving a pronounced high molecular weight tail and very high Mw/Mn have a good neck-in draw down balance. Tubular materials, here low density polyethylenes produced in a tubular reactor, will due to the plug flow in the reactor generally have a narrower Mw/Mn and will not have good neck-in draw down balance. Especially neck-in will be high with a tubular material and web stability is also lower. In order to have a neck-in draw down balance and web stability at high line speeds the tubular material must have a broader Mw/Mn than usual. This has, according to the invention, surprisingly been achieved in polymerization in a tubular reactor by having a high radical initiator feed to introduce radical transfer to polymer and from there get larger differences in molecular weight between the polymer chains.

In a further embodiment the low density polyethylene of the present invention has a molecular weight distribution Mw/Mn which is greater than 16.

In still a further embodiment the molecular weight distribution Mw/Mn is greater than 17.

Still a further embodiment of the present invention provides a low density polyethylene wherein the molecular weight distribution Mw/Mn is greater than 18.

An even further embodiment of the present invention provides a low density polyethylene of the present invention wherein the molecular weight distribution Mw/Mn is greater than 19.

Further, the low density polyethylene of the present invention has a storage modulus G' (5 kPa), measured at a loss modulus G" of 5 kPa, which is above 3000.

In a further embodiment the low density polyethylene of the present invention has a storage modulus G' (5 kPa) which is above 3100.

In still a further embodiment the low density polyethylene of the present invention has a storage modulus G' (5 kPa) which is above 3200.

Still a further embodiment of the present invention provides a low density polyethylene which has a storage modulus G' (5 kPa) which is above 3300.

In a further embodiment the low density polyethylene of the present invention has a storage modulus G' (5 kPa) which is above 3400.

In an even further embodiment the low density polyethylene of the present invention has a storage modulus G' (5 kPa) which is above 3450.

In still a further embodiment the low density polyethylene of the present invention has a storage modulus G' (5 kPa) which is above 3500.

Further, the low density polyethylene of the present invention has a vinylidene content which is at least 15/100 k C.

Vinylidene is formed by beta-scission of tertiary carbon radicals. With increased branching by higher radical initiator amount, the number of tertiary carbon radicals will increase and also the probability of beta-scission and creation of a vinylidene. The vinylidene content will then be an indirect measurement on the amount of introduced branches in the low density polyethylene of the present invention. The vinylidene content is given per 100 k C, where 100 k C means 100000 carbon atoms.

The branching originates from radical transfer to the polymer backbone. These transfer reactions are necessary for differentiation of the molecular weights between the chains, propagation leading to long-chain branching or termination via combination leading to two chains is merged into one. The introduction of long chain branching and high molecular weight material, make the material, here the low density polyethylene of the present invention, exhibiting entanglements in the melt which leads to higher melt strength (reduced neck-in).

In a further embodiment the low density polyethylene of the present invention has a vinylidene content which is at least 17/100 k C.

In still a further embodiment the vinylidene content is at least 19/100 k C.

Still a further embodiment of the present invention provides a low density polyethylene wherein the vinylidene content is at least 20/100 k C.

In a further embodiment of the present invention a low density polyethylene is provided wherein the vinylidene content is at least 22/100 k C.

An even further embodiment of the present invention provides a low density polyethylene wherein the vinylidene content is at least 24/100 k C.

In a further embodiment the low density polyethylene of the present invention has a vinylidene content which is at least 25/100 k C.

A further embodiment of the present invention provides a low density polyethylene, as described herein, wherein the low density polyethylene is a homopolymer of ethylene.

Still a further embodiment of the present invention provides a low density polyethylene, as described herein, wherein the low density polyethylene has a density in the interval of 900-935 kg/m$^3$, e.g. in the interval of 910-935 kg/m$^3$.

A further embodiment of the present invention provides a low density polyethylene, as described herein, wherein the low density polyethylene is produced in a tubular reactor.

A low density polyethylene which is produced in a tubular reactor will have a molecular weight distribution without the pronounced high molecular weight tail present in autoclave materials. This difference in the appearance of the molecular weight distribution is expected and detectable to a person skilled in the art.

In a further embodiment the low density polyethylene of the present invention has a melt flow rate (MFR) according to ISO 1133 (190° C., 2.16 kg) higher than 3.0 g/10 min.

In still a further embodiment the low density polyethylene of the present invention has a melt flow rate (MFR) according to ISO 1133 (190° C., 2.16 kg) which is from 3 to 20 g/10 min.

In a further embodiment of the invention the low density ethylene polymer has a weight average molecular weight, Mw, of from 40000 to 250000 g/mol, e.g. from 47000 to 240000 g/mol.

The present invention also relates to compositions comprising the low density polyethylene, which compositions may be useful in extrusion coating. There are commercially available polypropylene, linear low density and high density polyethylene grades for extrusion coating where processability is achieved by modifying them with autoclave LDPE giving the melt strength needed. A tubular LDPE with suitable melt strength can be used for same purpose.

In a further aspect, the present invention relates to a composition comprising the new low density polyethylene, which composition is useful in extrusion coating processes.

Accordingly, the present invention provides a composition, useful in extrusion coating processes, which composition comprises the low density polyethylene of the present invention, and, optionally, additionally further components, e.g. olefin polymers such as polyethylene or polypropylene, for example, linear homopolymers of ethylene and/or copolymers of ethylene and one or more alpha-olefin comonomers having from 3 to 20 carbon atoms. Homo- and copolymers of ethylene, homo- and copolymers of propylene and homo- and copolymers of 1-butene are also examples of further components. Said olefin polymers may be produced by polymerising olefins in the presence of transition metal polymerisation catalysts. Further components include, e.g., bimodal copolymers of ethylene and at least two alpha-olefin comonomers, like those disclosed in WO 2005/002744 and WO 03/66698.

Furthermore, examples of such further components may be, e.g., olefin polymers such as homo- and copolymers of ethylene, homo- and copolymers of propylene and homo- and copolymers of 1-butene.

Furthermore, the composition of the present invention may further comprise antioxidants, stabilizers and other additives known in the art.

The composition of the present invention, useful in extrusion coating processes, may include the new low density polyethylene in an amount of from 5 to 40% by weight, based on the total weight of the composition. In a further embodiments the composition may comprise from 10 to 35% by weight, or alternatively from 20 to 35% by weight, of the new low density polyethylene. Furthermore, in addition to the new low density polyethylene, the composition may further comprise of from 60 to 95% by weight, for example, from 65 to 90%, and e.g. from 65 to 80% of at least one further component selected from a linear ethylene homopolymer, and a copolymer of ethylene with one or more alpha-olefin comonomers having from 3 to 20 carbon atoms.

A further embodiment of the invention provides a composition comprising
   the low density polyethylene of the present invention, and
   at least one olefin polymer prepared in the presence of a transition metal catalyst, wherein the olefin polymer may be selected from homo- or copolymers of polyethylene, polypropylene or poly-1-butene, and the low density polyethylene may be present in an amount of 5 to 40 wt %, based on the total weight of the composition.

In a further embodiment of the invention a composition, as described herein, is disclosed, which comprises the low density polyethylene, in accordance with the invention, in an amount of 5 to 40 wt %, based on the total weight of the composition, and further comprises at least one olefin polymer prepared in the presence of a transition metal catalyst, which at least one olefin polymer may be selected from homo- or copolymers of polyethylene, polypropylene or poly-1-butene.

In line with the present invention, the composition can be processed in an extrusion coating line with a high line speed and minimum risk of draw resonance.

The compositions of the present invention can be extrusion coated to different substrates at high line speeds and the compositions may have a reduced tendency to undergo draw resonance and an even distribution of the coating may be obtained. This would allow a high throughput in the coating line with a maintained good product quality. Thus, the low density polyethylene according to the present invention can be used to make compositions which may exhibit an excellent processability. On the other hand, any advantageous properties of any other composition components present in the composition may be maintained. Therefore, the low density polyethylene according to present invention can be used to improve the processability of different compositions having various advantageous properties, such as good optical properties, good sealing properties and good abrasion resistance. Further still, the compositions of the present invention may have a low neck-in and excellent processability at high line speeds (meaning high draw-down and web stability) when used in extrusion coating. In particular, the neck-in decreases when the line speed increases, which results in better coating performance at higher throughput. A low neck-in leads to a low amount of wasted substrate material, as the uncoated part of the substrate needs to be cut off and discarded. The substrate to be coated can be any substrate known in the art, such as paper, paperboard, Kraft paper, metal foil, plastic foil and cellophane foil. To improve the adhesion between the substrate and a the coating polymer layer the methods commonly known in the art may be used, such as ozone treatment of the molten polymer film, flame treatment and corona treatment of the substrate, an adhesive layer may be used, and an adhesion promoter may be used.

A further object of the invention is a process for production of a low density polyethylene, of the present invention, in a tubular reactor by radical initiated polymerization under high pressure, wherein the polymerization is performed by reacting ethylene monomer under the action of one or more radical initiators, such as peroxides, oxygen or combinations thereof, wherein the amount of used radical initiators, i.e. the amount of used active oxygen, is at least 3 times the conventionally used amount. By selecting the amount of radical initiators in the polymerization we have surprisingly been able to produce a low density polyethylene exhibiting advantageous properties.

Still a further object of the invention includes a process for production of the low density polyethylene, of the present invention, in a tubular reactor under high pressure by radical initiated polymerization where the polymerization is performed by reacting the ethylene monomer under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C., wherein the amount of used radical initiators, i.e. the amount of used active oxygen, is at least 0.125 kg AO/ton PE.

An even further object of the invention includes a process for production of the low density polyethylene, of the present invention, in a tubular reactor under high pressure by radical initiated polymerization where the polymerization is performed by reacting the ethylene monomer under the action of one or more radical initiators, being peroxides, comprising low temperature decomposition peroxides, e.g., peroxides having a 0.1 hour half-life temperature which is below 100° C., wherein the amount of used radical initiators, i.e. the amount of used active oxygen per tonne polyethylene, is at least 0.125 kg AO/ton PE, or alternatively at least 0.127 kg AO/ton PE.

A further object of the invention is a process for production of a low density polyethylene, of the present invention, in a tubular reactor by radical initiated polymerization under high pressure, which pressure is from 1000 to 3000 bar, e.g. from 1500 to 2500 bar, wherein the polymerization is performed by reacting ethylene monomer under the action of one or more radical initiators, such as peroxides, oxygen or combinations thereof, wherein the amount of used radical initiators, i.e. the amount of used active oxygen, is at least 3 times the conventionally used amount. By selecting the amount of radical initiators in the polymerization we have surprisingly been able to produce a low density polyethylene exhibiting advantageous properties.

Still a further object of the invention includes a process for production of the low density polyethylene, of the present invention, in a tubular reactor under high pressure, which pressure is from 1000 to 3000 bar, e.g. from 1500 to 2500 bar, by radical initiated polymerization where the polymerization is performed by reacting the ethylene monomer under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C., wherein the amount of used radical initiators, i.e. the amount of used active oxygen, is at least 0.125 kg AO/ton PE.

An even further object of the invention includes a process for production of the low density polyethylene, of the present invention, in a tubular reactor under high pressure, which pressure is from 1000 to 3000 bar, e.g. from 1500 to 2500 bar, by radical initiated polymerization where the polymerization is performed by reacting the ethylene monomer under the action of one or more radical initiators, being peroxides, comprising low temperature decomposition peroxides, e.g., peroxides having a 0.1 hour half-life temperature which is below 100° C., wherein the amount of used radical initiators, i.e. the amount of used active oxygen per tonne polyethylene, is at least 0.125 kg AO/ton PE, or alternatively at least 0.127 kg AO/ton PE.

Furthermore, the present invention do also relate to a continuous ethylene polymerization method for introducing a high vinylidene content in a low density polyethylene, wherein vinylidene is introduced by using an amount of radical initiators, i.e. an amount of used active oxygen, which is at least 3 times the conventionally used amount. Further, the continuous ethylene polymerization, for introducing a high vinylidene content in a low density polyethylene, is a radical initiated polymerization where the polymerization is performed by reacting the ethylene monomer under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C.

A further embodiment discloses the continuous ethylene polymerization method for introducing high vinylidene content in a low density polyethylene, the ethylene polymerization is a radical initiated polymerization and the polymerization is performed by reacting the ethylene monomer under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C., wherein the amount of used radical initiators, i.e. the amount of used active oxygen, is at least 0.125 kg AO/ton PE, or alternatively at least 0.127 kg AO/ton PE.

Further embodiments disclose a process for production of the low density polyethylene, as described herein, or a continuous ethylene polymerization method, as described herein, wherein a radical initiator cocktail is used, which is composed of the following radical initiators, where the 0.1 hours half life temperature (T½) is given for each radical initiator: Initiator A (T½ 0.1 h at 75-90° C. in chlorobenzene), Initiator B (T½ 0.1 h at 80-95° C. in chlorobenzene), Initiator C (T½ 0.1 h at 105-125° C. in chlorobenzene), Initiator D (T½ 0.1 h at 125-140° C. in chlorobenzene) and Initator E (T½ 0.1 h at 155-175° C. in chlorobenzene).

Another object of the invention relates to a method for an extrusion coating process, which method comprises extrusion coating a flat substrate with a line speed of at least 375 m/min by extruding the low density polyethylene of the invention, or the composition of the invention, in a molten state through a flat die onto said substrate at a temperature of from 275° C. to 330° C.

In an extrusion coating process a substrate is coated with polymer. The substrate is typically a fibrous substrate, such as paper, paperboard or Kraft paper or woven or non-woven fabrics; a metal foil, such as aluminum foil; or a plastic film, such as a biaxially oriented polypropylene film, PET film, PA film or cellophane film. The polymer is extruded onto the moving substrate through a flat die. The polymer melt exits the die typically at a high temperature, typically between 275 to 330° C. After exiting the die the polymer melt is oxidized when it comes into contact with air. The oxidation improves the adhesion between the coating and the substrate.

When the melt exits the die the melt film is pulled down into a nip between two rollers, the pressure roll and the chill roll, situated below the die. The substrate, moving at a velocity which is higher than that of the melt film, draws the film to the required thickness. The pressure between the two rolls forces the film onto the substrate. Further, the film is cooled and solidified by the low temperature of the chill roll.

The draw-down ratio, which is one of the characteristic parameters of the extrusion coating process, is the ratio of the die gap to the thickness of the polymer film on the substrate.

In a typical extrusion coating process the substrate is passed at a high velocity, typically more than 100 m/min or more than 300 m/min.

Description of extrusion coating process is given, for instance, in Crystalline Olefin Polymers, Part II, by R. A. V. Raff and K. W. Doak (Interscience Publishers, 1964), pages 478 to 484, or Plastics Processing Data Handbook, by Dominick V. Rosato (Chapman & Hall, 1997), pages 273 to 277.

The low density polyethylene of the invention, or the composition of the invention may be used in many applications as for instance in extrusion coating.

According to the invention the article must comprise a substrate and at least one extrusion coated layer based on the low density polyethylene of the invention, or the composition of the invention.

As mentioned above the substrate is extrusion coated and thus at least one surface of the substrate is coated. It is however within the scope of the invention that both sides of the substrate, i.e. the outer and inner surface (side) of the substrate are extrusion coated. It is also within the scope of the invention that the layer based on the low density polyethylene of the invention, or based on the composition of the invention, is in directed contact with the substrate or that between the substrate and the layer based on the low density polyethylene of the invention, or based on the composition of the invention, at least one further layer is inserted, like an adhesive layer. Also included are embodiments in which the layer based on the low density polyethylene of the invention, or based on the composition of the invention, has been subjected to ozone treatment or flame treatment and/or the substrate has been subjected to corona treatment, respectively, for improving the adhesion between the layer based on the low density polyethylene of the invention, or based on the composition of the invention, and the substrate.

The layer based on the low density polyethylene of the invention, or based on the composition of the invention, comprised in the extrusion coated substrate has preferably a thickness in the range of 5 to 1000 μm, more preferably in the range of 10 to 100 μm. The specific thickness will be selected according to the nature of the substrate, its expected subsequent handling conditions and, most importantly, the subsequent use of the end product. The thickness of the substrate may generally be chosen freely and has no effect on the coating process. It can typically be from 1 to 1000 μm. e.g. 5 to 300 μm.

The extrusion coating process is preferably carried out using conventional extrusion coating techniques. Hence, the low density polyethylene of the invention, or the composition of the invention, is fed to an extruding device. From the extruder the melt of the low density polyethylene of the invention, or of the composition of the invention, is passed through a flat die to the substrate to be coated. Due to the distance between the die lip and the nip, the molten plastic is oxidized in the air for a short period, usually leading to an improved adhesion between the coating and the substrate. The coated substrate is cooled on a chill roll, after which it is passed to edge trimmers and wound up. The die width typically depends on the size of the extruder used. Thus, with 90 mm extruders the width may suitably be within the range of 600 to 1200 mm, with 115 mm extruders from 900 to 2500 mm, with 150 mm extruders from 1000 to 4000 mm and with 200 mm extruders from 3000 to 5000 mm. A line speed of up to 375 m/min and preferably up to 350 m/min, for instance 300 to 325 m/min may be reached. The temperature of the melt of the low density polyethylene of the invention, or of the composition of the invention, is typically between 275 and 330° C. It is also possible to employ a coating line with at least two extruders to make it possible to produce multilayered coatings with different polymers. It is also possible to have arrangements to treat the melt of the low density polyethylene of the invention, or of the composition of the invention, exiting the die to improve adhesion, e.g. by ozone treatment, and the substrate with corona treatment or flame treatment. For the corona treatment, for instance the substrate is passed between two conductor elements serving as electrodes, with such a high voltage, usually an alternating voltage (about 10000 V and 10000 Hz), being applied between the electrodes that spray or corona discharges can occur.

A further embodiment of the invention discloses a method for an extrusion coating process, which method comprises extrusion coating a flat substrate with a line speed of at least 350 m/min by extruding the low density polyethylene of the invention, or the composition of the invention, in a molten state through a flat die onto said substrate at a temperature of from 275° C. to 330° C.

Still a further embodiment of the invention discloses a method for an extrusion coating process, which method comprises extrusion coating a flat substrate with a line speed of at least 325 m/min by extruding the low density polyethylene of the invention, or the composition of the invention, in a molten state through a flat die onto said substrate at a temperature of from 275° C. to 330° C.

An even further embodiment of the invention discloses a method for an extrusion coating process, which method comprises extrusion coating a flat substrate with a line speed of at least 300 m/min by extruding the low density polyethylene of the invention, or the composition of the invention, in a molten state through a flat die onto said substrate at a temperature of from 275° C. to 330° C.

With the method for the extrusion coating process which method comprises extruding the low density polyethylene of the invention, it has surprisingly been shown to be possible to utilize a low density polyethylene of a tubular reactor origin in an extrusion coating process and to achieve good neck-in properties which is usually poor for a traditionally produced tubular LDPE. Besides the good neck-in also good web stability, wherein no edge weaving is noticed, at a line speed of 300 m/min and where an even coating weight is obtained.

Edge weaving is defined as having started at the line speed where the edges of the web move 2 mm or more.

A further embodiment discloses an article, e.g. an extrusion article, comprising at least one layer of the low density polyethylene of the invention, or at least one layer of the composition of the invention.

An object of the invention is use of a low density polyethylene of the present invention, or use of a composition comprising the low density polyethylene of the present invention, in, for example, extrusion coating, extrusion lamination, film blowing, film casting, wire and cable extrusion, injection moulding, blow moulding or pipe extrusion.

A further object of the invention is use of a low density polyethylene of the present invention, or use of a composition comprising the low density polyethylene of the present invention, in extrusion coating.

Description of Analytical Methods
Molecular Weights, Molecular Weight Distribution (Mn, Mw, MWD)—GPC A PL 220 (Agilent) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. All samples were prepared by dissolving 8.0-12.0 mg of polymer in 10 mL (at 160° C.) of stabilized TCB (same as mobile phase) for 2.5 hours for PP or 3 hours for PE at 160° C. under continuous gentle shaking. The injected concentration of the polymer solution at 160° C. ($c_{160°\,C.}$) was determined in the following way.

$$c_{160°C.} = \frac{w_{25}}{V_{25}} * 0.8772$$

With: $w_{25}$ (polymer weight) and $V_{25}$ (Volume of TCB at 25° C.).

The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm³/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". The dn/dc used for the determination of molecular weight was calculated from the detector constant of the RI detector, the concentration c of the sample and the area of the detector response of the analysed sample.

This molecular weight at each slice is calculated in the manner as it is described by C. Jackson and H. G. Barth (C. Jackson and H. G. Barth, "Molecular Weight Sensitive Detectors" in: Handbook of Size Exclusion Chromatography and related techniques, C.-S. Wu, 2$^{nd}$ ed., Marcel Dekker, New York, 2004, p. 103) at low angle. For the low and high molecular weight region in which less signal of the LS detector or RI detector respectively was achieved a linear fit was used to correlate the elution volume to the corresponding molecular weight. Depending on the sample the region of the linear fit was adjusted.

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\Sigma(A_i/M_i)} \quad (1)$$

$$M_w = \frac{\sum_{i=1}^{N} (A_i \times M_i)}{\Sigma A_i} \quad (2)$$

$$M_z = \frac{\sum_{i=1}^{N} (A_i \times M_i^2)}{\Sigma(A_i/M_i)} \quad (3)$$

For a constant elution volume interval $\Delta V_i$, where $A_i$ and $M_i$ are the chromatographic peak slice area and polyolefin molecular weight (MW) determined by GPC-LS.

Melt Flow Rate

Melt flow rate of the low density polyethylene was determined according to ISO 1133 at 190° C. under a load of 2.16 kg (MFR). The melt flow rate is that quantity of polymer in grams which the test apparatus standardised to ISO 1133 extrudes within 10 minutes at a temperature of 190° C. under a load of 2.16 kg.

Storage Modulus (G')

Dynamic Shear Measurements (Frequency Sweep Measurements)

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where
$\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0}\cos\delta \text{ [Pa]} \quad (3)$$

$$G'' = \frac{\sigma_0}{\gamma_0}\sin\delta \text{ [Pa]} \quad (4)$$

$$G^* = G' + iG'' \text{ [Pa]} \quad (5)$$

-continued $$\eta^* = \eta' - i\eta'' \ [\text{Pa}\cdot\text{s}] \quad (6)$$

$$\eta' = \frac{G''}{\omega} \ [\text{Pa}\cdot\text{s}] \quad (7)$$

$$\eta'' = \frac{G'}{\omega} \ [\text{Pa}\cdot\text{s}] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (9).

$$EI(x)=G' \text{ for } (G''=x \text{ kPa})[\text{Pa}] \quad (9)$$

For example, the EI(5 kPa) is the defined by the value of the storage modulus G', determined for a value of G" equal to 5 kPa.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995.).
[3] Definition of terms relating to the non-ultimate mechanical properties of polymers, Pure & Appl. Chem., Vol. 70, No. 3, pp. 701-754, 1998.

Quantification of Microstructure by NMR Spectroscopy

Quantitative nuclear-magnetic resonance (NMR) spectroscopy was used to quantify the content of unsaturated groups present in the polymers.

Quantitative $^1$H NMR spectra recorded in the solution-state using a Bruker Advance III 400 NMR spectrometer operating at 400.15 MHz. All spectra were recorded using a $^{13}$C optimised 10 mm selective excitation probehead at 125° C. using nitrogen gas for all pneumatics. Approximately 200 mg of material was dissolved in 1,2-tetrachloroethane-d$_2$ (TCE-d$_2$) using approximately 3 mg of Hostanox O3 (CAS. no. 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups. {he10a, busico05a} All chemical shifts were internally to the signal resulting from the residual protonated solvent at 5.95 ppm.

Characteristic signals corresponding to the presence of terminal vinyl groups (R—CH=CH$_2$) were observed and the amount of vinylidene groups quantified using the integral of the coupled terminal Va and Vb protons at 4.95, 4.98 and 5.00 and 5.05 ppm respectively accounting for the number of reporting sites per functional group:

$$N\text{vinyl}=(IVa+IVb)/2$$

The content of vinyl groups was calculated as the fraction of vinyl group in the polymer with respect to the total number of carbons present:

$$U\text{vinyl}=N\text{vinyl}/C\text{total}$$

Characteristic signals corresponding to the presence of internal vinylidene groups (RR'C=CH$_2$) were observed and the amount of vinylidene groups quantified using the integral of the two D terminal protons at 4.74 ppm accounting for the number of reporting sites per functional group:

$$N\text{vinylidene}=ID/2$$

The content of vinylidene groups was calculated as the fraction of vinylidine group in the polymer with respect to the total number of carbons present:

$$U\text{vinylidene}=N\text{vinylidene}/C\text{total}$$

Characteristic signals corresponding to the presence of internal cis-vinylene groups (E-RCH=CHR') were observed and the amount of cis-vinylene groups quantified using the integral of the two C protons at 5.39 ppm accounting for the number of reporting sites per functional group:

$$N\text{cis}=IC/2$$

The content of cis-vinylene groups was calculated as the fraction of cis-vinlylene group in the polymer with respect to the total number of carbons present:

$$U\text{cis}=N\text{cis}/C\text{total}$$

Characteristic signals corresponding to the presence of internal trans-vinylene groups (Z—RCH=CHR') were observed and the amount of trans-vinylene groups quantified using the integral of the two T protons at 5.45 ppm accounting for the number of reporting sites per functional group:

$$N\text{trans}=IT/2$$

The content of trans-vinylene groups was calculated as the fraction of trans-vinlylene group in the polymer with respect to the total number of carbons present:

$$U\text{trans}=N\text{trans}/C\text{total}$$

The total amount of carbon was calculated from the bulk aliphatic integral between 2.85 and −1.00 accounting for the number of reporting nuclei and compensation for sites relating to unsaturation not including in this region:

$$C\text{total}=(½)*(I\text{aliphatic}+N\text{vinyl}+N\text{vinylidene}+N\text{cis}+N\text{trans})$$

The total amount of unsaturated group was calculated as the sum of the individual observed unsaturated groups and thus also reported with respect to the total number of carbons present:

$$U\text{total}=U\text{vinyl}+U\text{vinylidene}+U\text{cis}+U\text{trans}$$

The unsaturation content is given as amount of unsaturated group/100 k C where 100 k C means 100000 carbon atoms.

The relative content of a specific unsaturated group (x) is reported as the fraction or percentage of a given unsaturated group with respect to the total amount of unsaturated groups:

$$[Ux]=Ux/U\text{total}$$

REFERENCES he10a
He, Y., Qiu, X, and Zhou, Z., Mag. Res. Chem. 2010, 48, 537-542.
busico05a
Busico, V. et. al. Macromolecules, 2005, 38 (16), 6988-6996

EXAMPLES

A low density polyethylene was produced by radical polymerization in a three zone, front-feed tubular reactor. Chain transfer agents used were a mixture of propionic aldehyde and propylene. The pressure in the reactor was between 220-285 MPa and the peak temperatures were in the range of 250 to 315° C.

Material A

Innovative Example

The initiator mixture used was composed of the following radical initiators (The 0.1 hours half life temperature (T½) given for each radical initiator):
Initiator A (T½ 0.1 h at 75-90° C. in chlorobenzene),
Initiator B (T½ 0.1 h at 80-95° C. in chlorobenzene),
Initiator C (T½ 0.1 h at 105-125° C. in chlorobenzene),
Initiator D (T½ 0.1 h at 125-140° C. in chlorobenzene) and
Initator E (T½ 0.1 h at 155-175° C. in chlorobenzene).

Three mixtures, one for each reaction zone, of organic peroxides (A-E) dissolved in isododecane was prepared and used as polymerisation initiator.
Zone 1 (Initiator A 50-150 kg/ton mixture, Initiator B 50-150 kg/ton mixture, Initiator C 50-150 kg/ton mixture, Initiator D 30-100 kg/ton mixture, Initiator E 20-100 kg/ton mixture)
Zone 2 (Initiator A 0-50 kg/ton mixture, Initiator B 0-50 kg/ton mixture, Initiator C 80-150 kg/ton mixture, Initiator D 80-150 kg/ton mixture, Initiator E 80-150 kg/ton mixture)
Zone 3 (Initiator A 0-50 kg/ton mixture, Initiator B 0-50 kg/ton mixture, Initiator C 0-100 kg/ton mixture, Initiator D 0-100 kg/ton mixture, Initiator E 0-100 kg/ton mixture)

About 27 000 kg/h of ethylene was fed to the front of the reactor. The added active oxygen from the organic peroxides was about 0.13 kg active oxygen/ton polyethylene. The polymerization yielded about 9300 kg polymer/h.

The chain transfer agent was added in such amounts that the polymer formed had a melt flow rate of about 4 g/10 min according to ISO 1133 (190° C., 2.16 kg).

The density of the polymer produced was about 918 kg/m³ according to ISO 1183.

Material B

Comparative Example

The radical initiator cocktail used was composed of the following radical initiators (The 0.1 hours half life temperature (T½) given for each radical initiator):
Initiator A (T½ 0.1 h at 75-90° C. in chlorobenzene),
Initiator B (T½ 0.1 h at 80-95° C. in chlorobenzene,
Initiator C (T½ 0.1 h at 105-125° C. in chlorobenzene), Initiator D (T½ 0.1 h at 125-140° C. in chlorobenzene) and Initator E (T½ 0.1 h at 155-175° C. in chlorobenzene).

Three mixtures, one for each reaction zone, of organic peroxides dissolved in isododecane was used as radical initiator.
Zone 1 (Initiator A 20-35 kg/ton mixture, Initiator B 15-25 kg/ton mixture, Initiator C 20-35 kg/ton mixture, Initiator D 15-35 kg/ton mixture, Initiator E 10-40 kg/ton mixture)
Zone 2 (Initiator A 15-35 kg/ton mixture, Initiator B 15-35 kg/ton mixture, Initiator C 15-35 kg/ton mixture, Initiator D 15-35 kg/ton mixture, Initiator E 20-40 kg/ton mixture)
Zone 3 (Initiator A 0-20 kg/ton mixture, Initiator B 5-20 kg/ton mixture, Initiator C 0-20 kg/ton mixture, Initiator D 10-35 kg/ton mixture, Initiator E 10-40 kg/ton mixture)

About 27 000 kg/h of ethylene were fed to the front of the reactor. The polymerization yielded about 7700 kg polymer/h. The added active oxygen was 0.04 kg active oxygen/ton polyethylene.

The chain transfer agent was added in such amounts that the polymer formed had a melt flow rate of about 5 g/10 min according to ISO 1133 (190° C., 2.16 kg).

The density of the polymer produced was about 920 kg/m³ according to ISO 1183.

The storage modulus G' at loss modulus G"=5 kPa of the low density polyethylene of the present invention, i.e. Material A, is generally higher than the standard tubular materials, e.g. Material B, produced with conventional techniques. From the examples, see Table 1, it is also clear that neck-in is reduced by increased G' (5 kPa).

Examples Extrusion Coating
Trial

In a trial the melt flow behaviour of the polymer compositions, i.e. Materials A and B, were tested.

Extrusion coating runs were made on Beloit coextrusion coating line. It had Peter Cloeren's EBR die and a five layer feed block. The width of the line die opening was 850-1000 mm, maximum width of the substrate is 800 mm and the line speed was maintained at 100 m/min.

The extrusion coating behaviour of the polymer compositions, i.e. Materials A and B, were analysed.

In the coating line above UG Kraft paper having a basis weight of 70 g/m² was coated with a layer of a polymer composition according to the present invention having a basis weight of 10 g/m². The temperature of the polymer composition melt, i.e. melt of Materials A or B, was set to 320° C.

Draw-down testing of the materials A and B were performed by increasing the line speed stepwise until web instability occurred. Coating weight (amount of polymer on substrate in g/m²) was kept at 10 g/m². Web instability was monitored visually through the amount of edge weaving and variations in coating weight. Samples were marked into the coated web at 100 m/min intervals, starting at 100 m/min until web instability occurred. Samples were taken out from the reel and neck-in was measured afterwards. Neck-in is defined as the difference in width of the die opening and width of the coating on the substrate.

The processability is improved with increased active oxygen feed. At higher active oxygen feed the material produced in a tubular reactor surprisingly has a draw-down neck-in balance similar to the draw-down neck-in balance that is known from traditional extrusion coating materials produced in autoclave reactor.

TABLE 1

| Material | MFR (190° C., 2.16 kg/10 min) | Active oxygen/ ton PE | Neck-in mm at 400 m/min | Edge weaving starts at (m/min) | Mw/Mn | G'(5 kPa) | Vinylidene/ 100k C |
| --- | --- | --- | --- | --- | --- | --- | --- |
| A | 4.0 | 0.129 | 79 | 400 | 18.9 | 3365 | 25.9 |
| B | 4.8 | 0.040 | 114 | 200 | 6.6 | 2650 | 12.8 |

The invention claimed is:

1. A low density polyethylene having
a molecular weight distribution Mw/Mn which is greater than 15,
a storage modulus G' (5 kPa) which is above 3000 Pa, and
a vinylidene content which is at least 15/100 k C.

2. A low density polyethylene according to claim 1, wherein the low the low density polyethylene is a homopolymer of ethylene.

3. A low density polyethylene according to claim 1, wherein the low density polyethylene has a density in the interval of 900-935 kg/m$^3$.

4. A low density polyethylene according to claim 1, wherein the low density polyethylene is produced in a tubular reactor.

5. A low density polyethylene according to claim 1, wherein the low density polyethylene has a melt flow rate (MFR) according to ISO 1133 (190° C., 2.16 kg) which is higher than 3.0 g/10 min.

6. A low density polyethylene according to claim 1, wherein the low density polyethylene has a storage modulus G' (5 kPa) which is above 3300 Pa.

7. A process for the production of the low density polyethylene according to claim 1, in a tubular reactor by radical initiated polymerization under high pressure where the polymerization is performed by reacting the ethylene monomer under the action of one or more radical initiators, such as peroxides, oxygen or combinations thereof, characterized by that the amount of used radical initiators, i.e. the amount of used active oxygen, is at least 3 times the conventionally used amount.

8. A process according to claim 7, wherein the amount of used radical initiators, i.e. the amount of used active oxygen, is at least 0.125 kg AO/ton PE or alternatively at least 0.127 kg AO/ton PE.

9. The process according to claim 7, wherein said high pressure is from 1000 to 3000 bar.

10. The process according to claim 8 where the polymerization is performed by reacting the ethylene monomer under the action of one or more peroxides, comprising low temperature decomposition peroxides.

11. The process according to claim 9 where the polymerization is performed under the action of one or more peroxides, comprising peroxides having a 0.1 hour half-life temperature which is below 100° C.

12. A process according to claim 7, wherein a radical initiator cocktail is used, which is composed of the following radical initiators, where the 0.1 hours half life temperature (T½) is given for each radical initiator: Initiator A, T½ 0.1 h at 75-90° C. in chlorobenzene, Initiator B, T½ 0.1 h at 80-95° C. in chlorobenzene, Initiator C, T½ 0.1 h at 105-125° C. in chlorobenzene, Initiator D, T½ 0.1 h at 125-140° C. in chlorobenzene, and Initator E, T½ 0.1 h at 155-175° C. in chlorobenzene.

13. An article comprising at least one layer comprising the low density polyethylene produced according to claim 1.

14. The article of claim 13, wherein the at least one layer comprises the low density polyethylene in an amount of 5 to 40 wt %, based on the total weight of the composition, and further comprises at least one olefin polymer prepared in the presence of a transition metal catalyst, which at least one olefin polymer is selected from homo- or copolymers of polyethylene, polypropylene or poly-1-butene.

15. A low density polyethylene according to claim 1, wherein the low density polyethylene has a density in the interval of 910-935 kg/m$^3$.

16. The process according to claim 7, wherein said high pressure is from 1500 to 2500 bar.

17. The article of claim 13, wherein the article is an extrusion article.

18. A low density polyethylene according to claim 1, wherein the low density polyethylene has a density in the interval of 900-919 kg/m$^3$.

19. A low density polyethylene according to claim 1, wherein the low density polyethylene has a density in the interval of 910-919 kg/m$^3$.

20. A low density polyethylene according to claim 1, wherein the low density polyethylene has a density in the interval of 917-919 kg/m$^3$.

* * * * *